(No Model.)
A. C. MATHER.
PNEUMATIC SPRING.
No. 530,999. Patented Dec. 18, 1894.
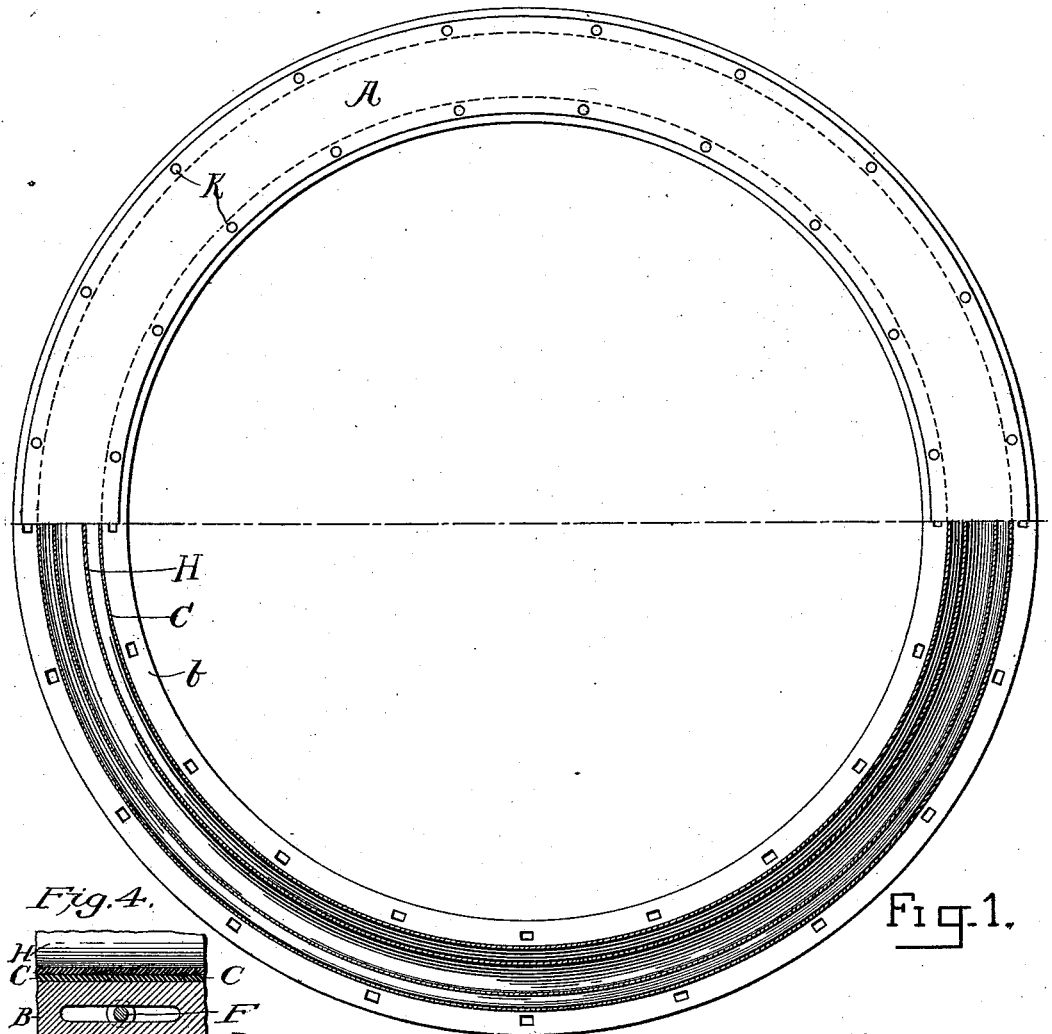
Fig.1.
Fig.4.
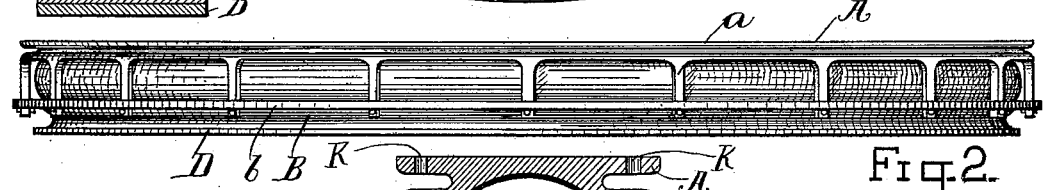
Fig.2.
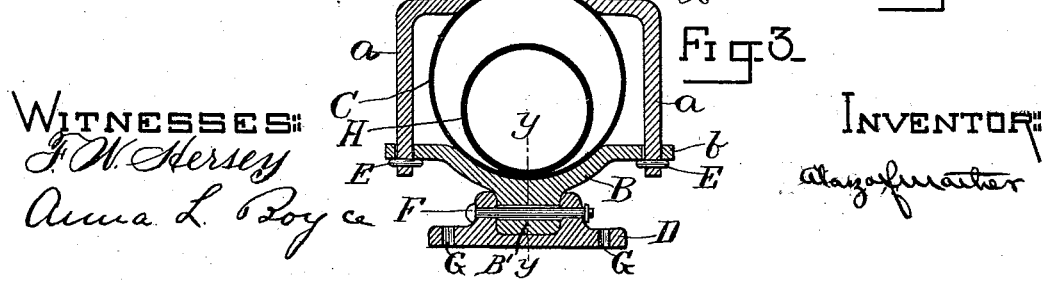
Fig.3.
WITNESSES:
F. W. Hersey
Anna L. Boyce
INVENTOR:
A. C. Mather

UNITED STATES PATENT OFFICE.

ALONZO C. MATHER, OF CHICAGO, ILLINOIS.

PNEUMATIC SPRING.

SPECIFICATION forming part of Letters Patent No. 530,999, dated December 18, 1894.

Application filed January 23, 1893. Serial No. 459,374. (No model.)

*To all whom it may concern:*

Be it known that I, ALONZO C. MATHER, a resident of Chicago, county of Cook, State of Illinois, have invented certain new and useful Improvements in Pneumatic Springs for Cars or other Vehicles; and I do hereby declare the following to be a full, clear, and exact description of my invention, such as will enable others skilled in the art to which it appertains to make use of the same.

My invention relates to an improved pneumatic spring of endless form with the king bolt of the car or vehicle for its center of location and consisting of an upper and lower metallic frame between which is placed the pneumatic spring, its lower half resting in any suitable bearing which is capable of maintaining oil and being kept well lubricated.

In the accompanying drawings, Figure 1 represents my pneumatic spring partly in section. Fig. 2 is a side elevation of the same. Fig. 3 is a cross section. Fig. 4 is a detail longitudinal section, showing the slot in which the bolt "F" plays.

(A) is the upper half of the frame or box cast upon and connected with which are the projections or prongs (a) which project downward and through holes in the flange (b) of the lower frame or box (B). Through the projections (a) passes the pin (E) which prevents the two frames from coming apart and yet enables the desired movement. The lower frame (B) has projecting downward from it the tongue (B') which fits into a corresponding groove in the bearing (D) which groove is made in such a manner that it will retain any oil that may be placed in it. Through the flanges of this groove and through the tongue (B') passes the bolt (F) which is so placed that it prevents the tongue from coming out of the groove and yet by a lateral slot cut in said tongue enables the bearing to move in the manner desired.

(C) represents the large pneumatic tube which may be made of any substance which will withstand the pressure and yet be flexible and within this tube is placed a second and smaller pneumatic tube (H) which is placed therein in case the outer tube should burst and also to give added elasticity when a very heavy load is on the spring as then the top of the frame will partially rest upon the smaller tube (H).

(K) are holes in the top frame by which it may be bolted to the body of the car or other vehicle.

(G) are holes in the lower bearing by which the spring may be fastened to the truck.

In operation, as it will be readily seen the lower bearing (G) is bolted to the running gear of the car while the upper frame is bolted to the body of the car containing the pneumatic spring in it. The location of the same is where the king bolt would be in its center. When thus applied, it will be readily seen that full elasticity of the air confined in the pneumatic tubes is given to the body of the car thus affording great comfort and very little noise or liability to get out of order.

Having thus described my invention, what I claim as new, and desire to secure by Letters Patent, is—

1. A pneumatic spring for a railroad car or other vehicle, consisting of two circular parts fastened flexibly together with a pneumatic tube between, and a sliding bearing upon which the lower part rests, substantially as set forth.

2. In a pneumatic spring the upper half of the frame (A) in combination with the lower half (B) the sliding bearing (D) and pneumatic spring (C) substantially as shown and described.

3. In a pneumatic spring for a railroad car or other vehicle, the combination of the upper frame "A:" the lower frame "B:" the projections or prongs "a" connecting said frames "A" and "B" so that they may move up and down and not become separated: the pneumatic tubes or rings "C" and "H" between said frames: the tongue "B'" projecting from the lower frame "B:" the bearing "D" into which said tongue fits and the bolt "F" passing through both bearing and tongue so that said tongue cannot be separated from said bearing and yet may move in it, all substantially as set forth.

4. In a pneumatic spring the combination of the lower frame (B) the tongue (B') projecting from said lower frame, the bearing (D) into which said tongue fits and the bolt (F) passing through so said tongue cannot be separated from the bearing and may yet move in it, all substantially as set forth.

ALONZO C. MATHER.

Witnesses:
ANNA L. BOYCE,
FRED W. HERSEY.